US010671976B2

(12) United States Patent
Zhang

(10) Patent No.: US 10,671,976 B2
(45) Date of Patent: Jun. 2, 2020

(54) INSTANT MESSAGING WINDOW DISPLAY METHOD AND APPARATUS, AND COMPUTER READABLE MEDIUM

(71) Applicant: TENCENT TECHNOLOGY (SHENZHEN) COMPANY LIMITED, Shenzhen (CN)

(72) Inventor: Jia Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 240 days.

(21) Appl. No.: 15/644,996

(22) Filed: Jul. 10, 2017

(65) Prior Publication Data

US 2017/0308861 A1 Oct. 26, 2017

Related U.S. Application Data

(63) Continuation of application No. PCT/CN2016/080973, filed on May 4, 2016.

(30) Foreign Application Priority Data

May 11, 2015 (CN) .......................... 2015 1 0238023

(51) Int. Cl.
*G06Q 10/10* (2012.01)
*H04L 12/58* (2006.01)
*G06F 3/0481* (2013.01)

(52) U.S. Cl.
CPC ......... *G06Q 10/107* (2013.01); *G06F 3/0481* (2013.01); *H04L 51/04* (2013.01);
(Continued)

(58) Field of Classification Search
CPC ...... G06F 3/0481; G06Q 10/107; H04L 51/04
See application file for complete search history.

(56) References Cited

U.S. PATENT DOCUMENTS 7,263,526 B1 8/2007 Busey et al.
2007/0245249 A1* 10/2007 Weisberg ................ G06F 9/451
715/758
(Continued)

FOREIGN PATENT DOCUMENTS

CN 101046721 A 10/2007
CN 101119327 A 2/2008
(Continued)

OTHER PUBLICATIONS

The Japan Patent Office (JPO) Office Action for Application No. 2017-557969 dated Oct. 2, 2018 5 Pages (including translation).
(Continued)

*Primary Examiner* — Ranodhi Serrao
(74) *Attorney, Agent, or Firm* — Anova Law Group, PLLC

(57) ABSTRACT

The present disclosure discloses an instant messaging window display method, including the following steps: running an instant messaging window on a user terminal; receiving a small window instruction; extracting, in response to the small window instruction, the instant messaging window run on the user terminal as a to-be-converted window; converting the to-be-converted window into a floating small window; and displaying the floating small window on the top of a current page of a browser. Therefore, the terminal converts the instant messaging window into the floating small window, and always keeps displaying the floating small window on the top of the current page of the browser. When the user browses and operates another webpage on the browser, the display of the floating small window is not affected. This is convenient for the user to check an instant messaging interaction message in time, thereby improving convenience of instant messaging interaction.

18 Claims, 8 Drawing Sheets

(52) U.S. Cl.
CPC .......... *H04L 51/046* (2013.01); *H04L 51/066* (2013.01); *H04L 51/043* (2013.01)

(56) References Cited

U.S. PATENT DOCUMENTS

| | | | |
|---|---|---|---|
| 2008/0177600 A1* | 7/2008 | McCarthy | G06Q 10/0639 705/7.33 |
| 2010/0037153 A1 | 2/2010 | Rogers | |
| 2011/0145744 A1 | 6/2011 | Haynes et al. | |
| 2012/0266101 A1 | 8/2012 | Shah | |
| 2013/0212466 A1 | 8/2013 | Khalatian | |
| 2014/0019884 A1* | 1/2014 | Dinan | H04L 12/1813 715/758 |

FOREIGN PATENT DOCUMENTS

| | | |
|---|---|---|
| CN | 102045269 A | 5/2011 |
| CN | 102281206 A | 12/2011 |
| CN | 102546762 A | 7/2012 |
| CN | 102946345 A | 2/2013 |
| CN | 103870194 A | 6/2014 |
| CN | 103957447 A | 7/2014 |
| CN | 104580670 A | 4/2015 |
| JP | 200585263 A | 3/2005 |

OTHER PUBLICATIONS

The World Intellectual Property Organization (WIPO) International Search Report for PCT/CN2016/080973, dated Aug. 10, 2016.
The State Intellectual Property Office of the People's Republic of China (SIPO) Office Action 1 for 201510238023.0 dated Feb. 14, 2020 10 Pages (including translation).

* cited by examiner

INSTANT MESSAGING WINDOW DISPLAY METHOD AND APPARATUS, AND COMPUTER READABLE MEDIUM

CROSS-REFERENCES TO RELATED APPLICATIONS

This application is a continuation application of PCT Patent Application No. PCT/CN2016/080973, filed on May 4, 2016, which claims priority to Chinese Patent Application No. 201510238023.0, entitled "INSTANT MESSAGING WINDOW DISPLAY METHOD AND APPARATUS", and filed with the Chinese Patent Office on May 11, 2015, which is incorporated herein by reference in its entirety.

FIELD OF THE TECHNOLOGY

The present disclosure relates to the field of Internet technologies, and in particular, to an instant messaging window display method and apparatus, and a computer readable medium.

BACKGROUND OF THE DISCLOSURE

Currently, there are generally two instant messaging manners for a terminal: one is installing an instant messaging client on the terminal, and running the client to enter a dialog window; and the other is opening a webpage-version instant messaging page on a browser of the terminal, and performing online messaging on the current page of the browser. However, both the two messaging manners need to ensure that the dialog window is displayed on a foreground. For example, when a chat is performed by using the client, a chat window of the client needs to be kept on the foreground. If a user simultaneously opens the browser to browse a webpage, the user needs to switch between the client and the browser, and an operation is inconvenient. When the user performs a chat in a webpage manner on the browser, the current chat webpage needs to be kept on the top. When browsing another webpage, the user cannot check a message on the chat webpage in time.

SUMMARY

Embodiments of the present invention provide an instant messaging window display method and apparatus, so as to check an instant messaging interaction message in time when a webpage is browsed.

The embodiments of the present invention provide an instant messaging window display method, which is applied to a user terminal and includes: running an instant messaging window on the user terminal; receiving a small window instruction; extracting the instant messaging window run on the user terminal as a to-be-converted window; converting the to-be-converted window into a floating small window; and displaying the floating small window on the top of a current page of a browser.

The embodiments of the present invention further provide an instant messaging window display apparatus, including: a running module, configured to run an instant messaging window on a user terminal; a receiving module, configured to receive a small window instruction; an extraction module, configured to: extract the instant messaging window run on the user terminal as a to-be-converted window; a conversion module, configured to convert the to-be-converted window into a floating small window; and a display module, configured to display the floating small window on the top of a current page of a browser.

The embodiments of the present invention provide a non-transitory computer readable storage medium containing one or more computer-executable programs for, when being executed by a processor, implementing an instant messaging window display method, the method including: running an instant messaging window on a user terminal; receiving a small window instruction; extracting the instant messaging window run on the user terminal as a to-be-converted window; converting the to-be-converted window into a floating small window; and displaying the floating small window on the top of a current page of a browser.

In the embodiments of the present invention, a terminal converts an instant messaging window into a floating small window, and always keeps displaying the floating small window on the top of a current page of a browser. When a user browses and operates another webpage on the browser, display of the floating small window is not affected. This is convenient for the user to check an instant messaging interaction message in time, thereby improving convenience of instant messaging interaction.

The objective achievement, functional features, and advantages of the present disclosure will be further illustrated with reference to the accompanying drawings by using embodiments.

DESCRIPTION OF EMBODIMENTS

It should be understood that specific embodiments described herein are merely used to explain the present disclosure but are not intended to limit the present disclosure.

Figure 1:
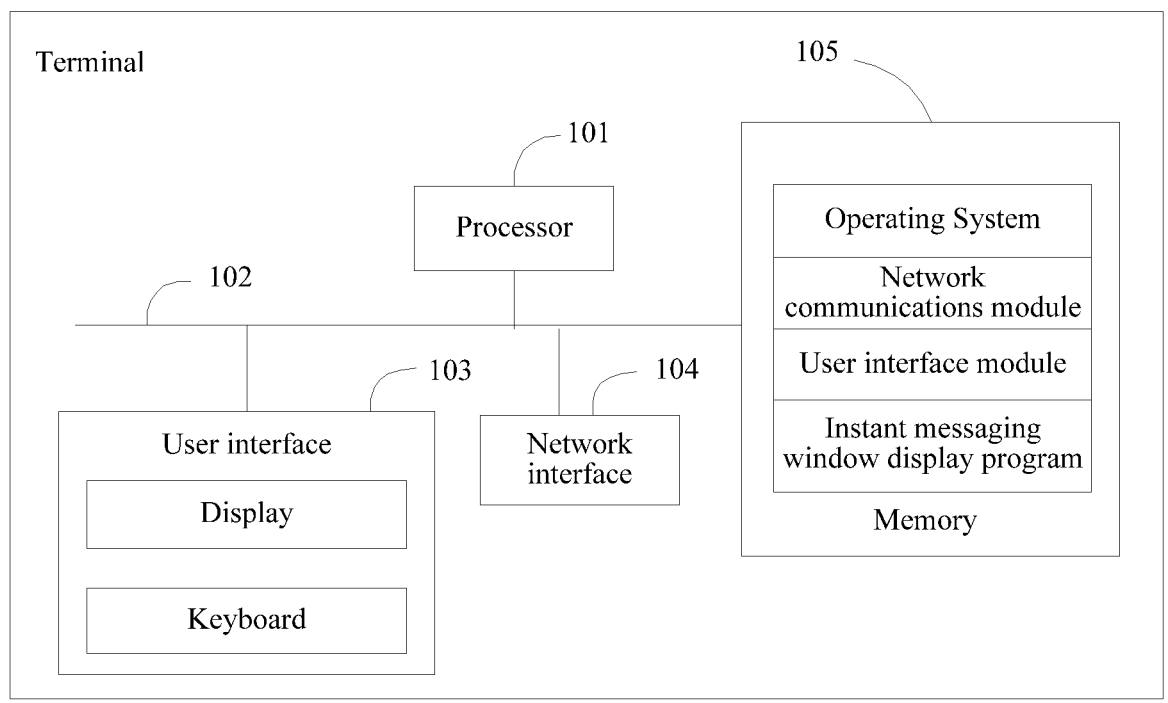
FIG. 1 is a block diagram of a terminal on which an instant messaging window display apparatus is located according to an embodiment of the present invention.

Referring to FIG. 1, FIG. 1 is a block diagram of a terminal on which an instant messaging window display apparatus is located according to an embodiment of the present invention. The terminal may include: at least one processor 101, for example, a CPU, at least one network interface 104, a user interface 103, a memory 105, and at least one communications bus 102. The communications bus 102 is configured to implement connection and communication between the components. The user interface 103 may include a display and a keyboard, and may further include a standard wired interface and wireless interface. The network interface 104 may include a standard wired interface and wireless interface (for example, a WiFi interface). The memory 105 may be a high-speed RAM memory, or a non-volatile memory, for example, at least one magnetic disk storage. Alternatively, the memory 105 may be at least one storage apparatus located far away from the processor 101. As a computer storage medium, the memory 105 may include: an operating system, a network communications module, a user interface module, and an instant messaging window display program.

In the terminal that implements the instant messaging window display apparatus/method as shown in FIG. 1, the network interface 104 is mainly configured to: connect to a server or another terminal, and perform data communication with the server and the another terminal. The user interface 103 is mainly configured to: receive a user instruction, and interact with a user. The processor 101 may be configured to: invoke the instant messaging window display program stored in the memory 105, and execute the following operations: running an instant messaging window on the terminal; receiving a small window instruction by using the user interface 103; extracting, in response to the small window instruction, the instant messaging window run on the terminal as a to-be-converted window; converting the to-be-converted window into a floating small window; and displaying the floating small window on the top of a current page of a browser by using the user interface 103.

In an embodiment, the instant messaging window is a dialog window of an instant messaging client, and the small window instruction is entered in the instant messaging client.

Correspondingly, the processor 101 invokes instructions that can be executed by a computer system and that are stored in the memory 105, so that the processor 101 executes the following operations: extracting the dialog window of the instant messaging client; and converting the dialog window into a dialog window of an instant messaging webpage, and using the dialog window of the instant messaging webpage as the to-be-converted window.

In an embodiment, the instant messaging window is a dialog window of the instant messaging webpage, and the small window instruction is entered in the instant messaging webpage.

Correspondingly, the processor 101 invokes the instructions that can be executed by the computer system and that are stored in the memory 105, so that the processor 101 executes the following operation: extracting the dialog window of the instant messaging webpage as the to-be-converted window.

In an embodiment, the processor 101 invokes the instructions that can be executed by the computer system and that are stored in the memory 105, so that the processor 101 executes the following operation: updating information content in the floating small window in real time by using the network interface 104; or regularly updating information content in the floating small window at a preset period by using the network interface 104.

In an embodiment, the processor 101 invokes the instructions that can be executed by the computer system and that are stored in the memory 105, so that the processor 101 executes the following operations: receiving a window creation instruction by using the user interface 103, and creating an instant messaging window according to the window creation instruction; extracting the created instant messaging window; converting the created instant messaging window into a created floating small window; and displaying the created floating small window on the top of the current page of the browser by using the user interface 103.

The instant messaging window display apparatus and the terminal on which the instant messaging window display apparatus is located that are described in FIG. 1 of this embodiment convert an instant messaging window into a floating small window, and always display the floating small window on the top of a current page of a browser. When a user browses and operates another webpage on the browser, display of the floating small window is not affected. This is convenient for the user to check an instant messaging interaction message in time, thereby improving convenience of instant messaging interaction.

Figure 2:
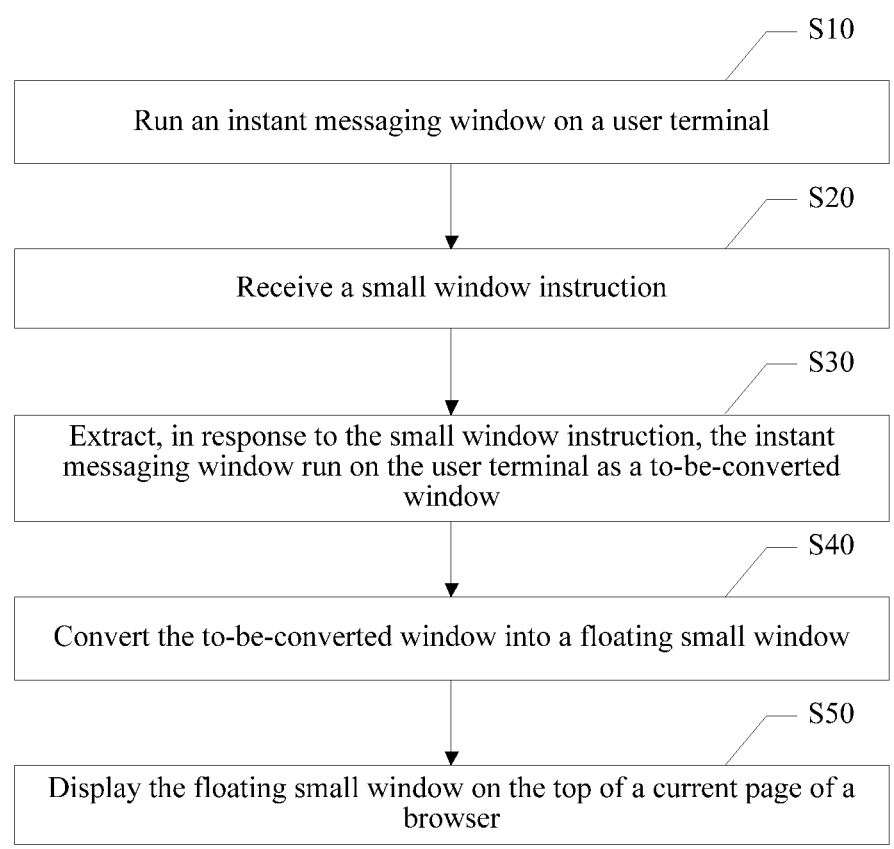
FIG. 2 is a flowchart of a first embodiment of an instant messaging window display method according to the present disclosure.

As shown in FIG. 2, FIG. 2 is a flowchart of a first embodiment of an instant messaging window display method according to the present disclosure. The instant messaging (IM) window display method according to this embodiment may be applied to a user terminal, where the method includes:

Step S10: Running an instant messaging window on a user terminal.

A hardware implementation environment of this embodiment may be a terminal, which includes: a mobile phone, a desktop computer, a tablet computer, an all-in-one machine, and the like. A user may launch an instant messaging client on the terminal or open an instant messaging webpage using a browser, and login with his/her IM account information, to interact with another person in an instant messaging dialog window. That is, the instant messaging dialog window may be a window generated by the instant messaging client, or a window generated on the instant messaging webpage by the browser. In some embodiments, the user may interact with multiple contacts in the instant messaging dialog window. The instant messaging dialog window may include multiple tabs (tab pages) corresponding to the multiple contacts. The user may select one tab to bring the tab to the foreground/top, and interact with the corresponding contact. The interactions between the user and another contact in the instant messaging dialog window may include: texts, graphics, file transmission, audio communication, video communication, etc.

Step S20: Receiving a small window instruction. The small window instruction may also be referred as a small-window initiation instruction.

When the user wants to browse another webpage on the user terminal, the user may select an option for starting a small window on the instant messaging client or the instant messaging webpage, to generate the small window instruction. There are two manners for entering the small window instruction. One manner is directly setting the option for starting the small window in a function setting bar of the instant messaging client or the instant messaging webpage. The user may tick, in advance, the option for starting the small window, so that when the user opens the dialog window, the terminal directly generates the small window instruction, and executes subsequent extraction, conversion, and display operations. The other manner is setting the option for starting the small window as a control in the dialog window. After opening the regular dialog window, the user clicks the control for starting a small window in the dialog window, and the terminal generates the small window instruction. In some embodiments, when the dialog window includes multiple tabs, the small window instruction may include information about which tabs to be included in the small window. In one example, the dialog window may display one control for starting the small window, and when selected, the dialog window may further display additional controls for each tab so that the user may select the desired tab(s) to be included in the small window. In another example, the dialog window may display, in each tab, a control for starting a small window, and the tabs corresponding to the selected controls may be included in the small window. In another example, the small window instruction may, by default, correspond to all tabs or the tab(s) on the foreground in the dialog window.

Step S30: Extracting, in response to the small window instruction, the instant messaging window run on the user terminal as a to-be-converted window. In some embodiments, when the dialog window includes multiple tabs, the terminal may extract one or more tabs according to the small window instruction.

Step S40: Converting the to-be-converted window into a floating small window.

The terminal extracts the currently opened dialog window according to the small window instruction, and coverts the currently opened dialog window into the floating small window in a form of a small-sized floating window.

Step S50: Displaying the floating small window on the top of a current page of a browser.

If the browser is not opened at present, the terminal first opens the browser. If the browser is already opened, the terminal displays, by default, the floating small window obtained through conversion on a specified area of the current page of the browser, and always keeps floatingly displaying the floating small window on the top/top layer/foreground. The specified area may be one of preset areas at four corners of the current page of the browser. The specified area is used only as an initial display location of the floating small window. If content of the page is covered on the area, the user may drag the floating small window to any location on the browser. When initially displayed, the floating small window may be displayed according to a preset default size. The user may drag a frame of the floating small window, to scale up or scale down the floating small window. The floating small window and the instant messaging window before conversion may have same functions. For example, the user may check conversation information (i.e., conversation content) between the user and a peer user in the floating small window, and may execute a corresponding operation in the floating small window, for example, entering and sending information or a file. When the user browses a page or executes a page operation on the browser, for example, clicks an operating control on a page, creates a page, closes a page, and switches a page, display of the floating small window is not affected, and the floating small window is always displayed on the top of the browser.

In this embodiment, a terminal converts an instant messaging window into a floating small window, and always displays the floating small window on the top of a current page of a browser. When a user browses and operates another webpage on the browser, display of the floating small window is not affected. This is convenient for a user to check an instant messaging interaction message in time, thereby improving convenience of instant messaging interaction.

Figure 3:
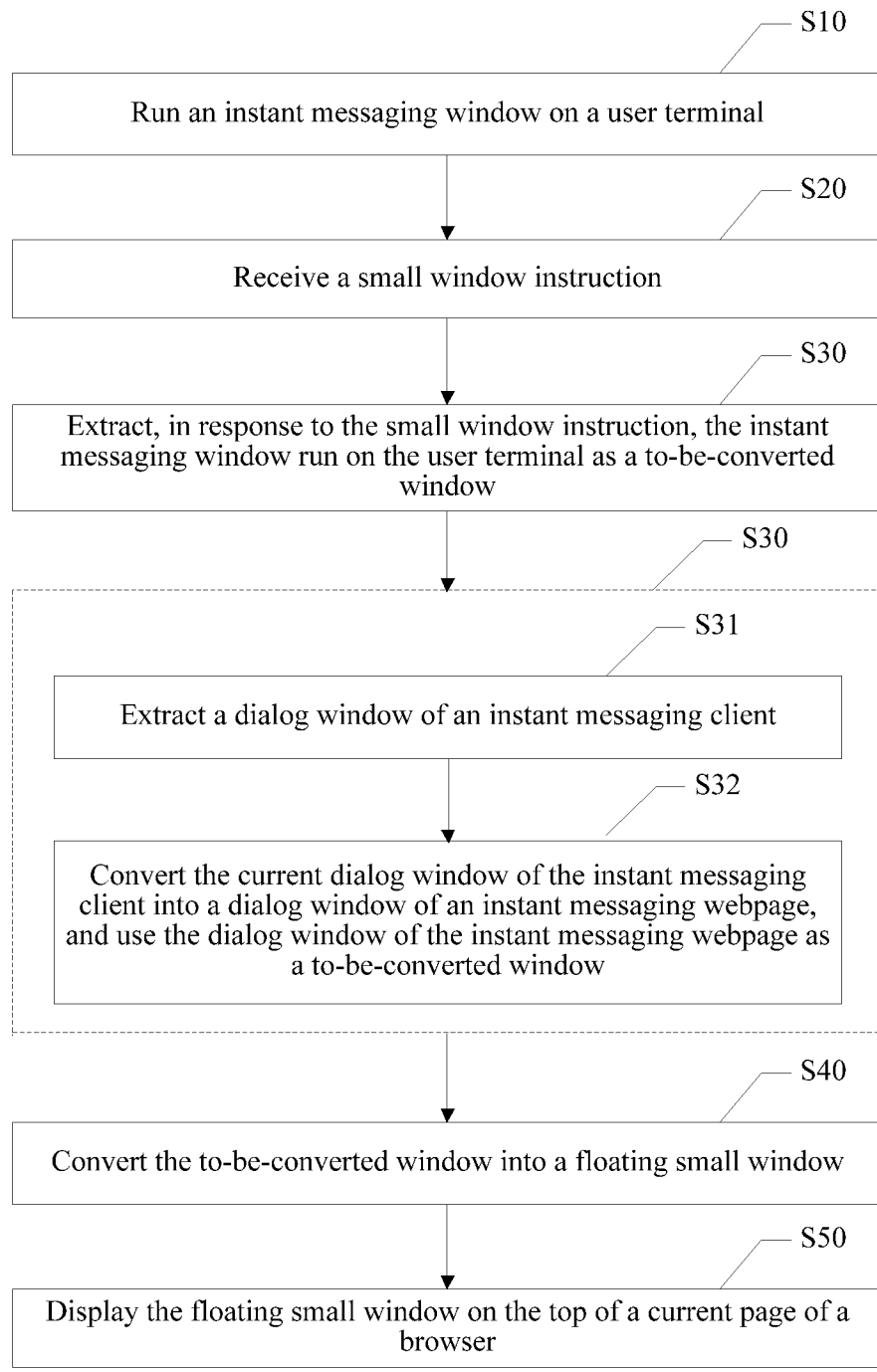
FIG. 3 is a flowchart of a second embodiment of an instant messaging window display method according to the present disclosure.

As shown in FIG. 3, FIG. 3 is a flowchart of a second embodiment of an instant messaging window display method according to the present disclosure. This embodiment includes all steps in the embodiment shown in FIG. 2, and step S30 is described in detail. In this embodiment, an instant messaging window is a dialog window of an instant messaging client, and a small window instruction is received by the instant messaging client.

In this embodiment, for a case in which a user uses the instant messaging client on a terminal, the user selects, in the instant messaging client, an option for starting a small window, to generate the small window instruction. If the first manner for starting the small window in the foregoing embodiment is used, the user ticks, in advance, the option for starting the small window on a setting interface of the instant messaging client. When the user opens the dialog window, the terminal directly generates the small window instruction. If the second manner for starting the small window in the foregoing embodiment is used, the user first opens the dialog window of the instant messaging client, and clicks a control for starting the small window in the dialog window, and the terminal generates the small window instruction.

Correspondingly, step S30 may include the following.

Step S31: Extracting a dialog window of an instant messaging client.

Step S32: Converting the current dialog window of the instant messaging client into a dialog window of an instant messaging webpage, and using the dialog window of the instant messaging webpage as a to-be-converted window.

The terminal extracts the current dialog window of the instant messaging client according to the small window instruction. In this embodiment, the small window needs to be displayed on a current page of a browser. Therefore, before converting the dialog window into a floating small window, the terminal further needs to convert the dialog window of the client into a webpage-version dialog window, and then converts the webpage-version dialog window into the floating small window. In addition, the terminal may further trigger, according to the small window instruction, the browser to run, and displays the floating small window obtained through conversion on the top of the current page of the browser.

In this embodiment, a dialog window of an instant messaging client is converted, so that the dialog window of the instant messaging client can also be converted into a floating small window, and the floating small window is displayed on the top of a current page of a browser. Therefore, when browsing another page, a user does not need to switch between the browser and the instant messaging client. This is convenient for the user to check an instant messaging conversation information (e.g., conversation message) at the same time of browsing a webpage.

Figure 4:
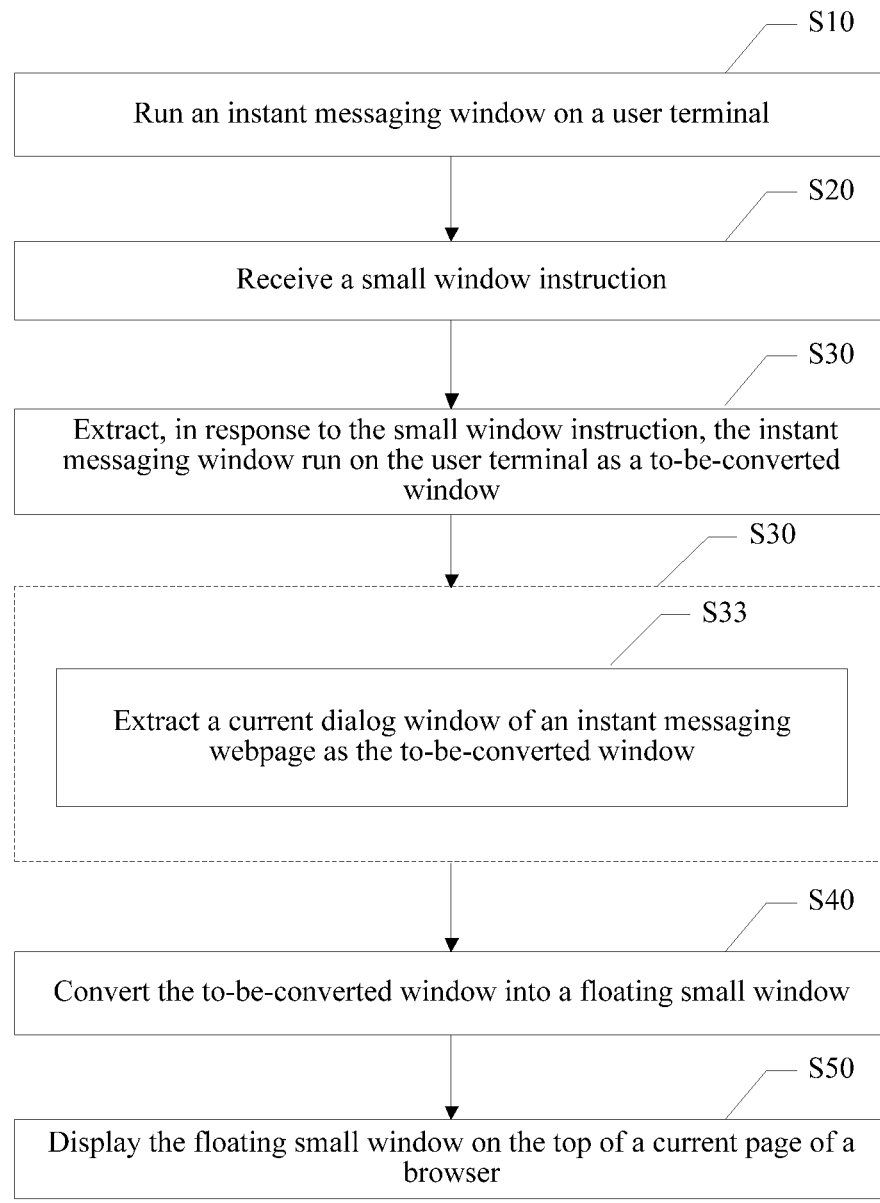
FIG. 4 is a flowchart of a third embodiment of an instant messaging window display method according to the present disclosure.

As shown in FIG. 4, FIG. 4 is a flowchart of a third embodiment of an instant messaging window display method according to the present disclosure. This embodiment includes all steps in the embodiment shown in FIG. 2, and step S30 is described in detail. In this embodiment, an instant messaging window is a dialog window of an instant messaging webpage, and a small window instruction is entered in the instant messaging webpage.

In this embodiment, for a case in which a user uses the instant messaging webpage on a terminal, the user selects, in the instant messaging webpage, an option for starting a small window, to generate the small window instruction. If the first manner for starting the small window in the foregoing embodiment is used, the user ticks, in advance, the option for starting the small window on a setting interface of the instant messaging webpage. When the user opens the dialog window, the terminal directly generates the small window instruction. If the second manner for starting the small window in the foregoing embodiment is used, the user first opens the dialog window of the instant messaging webpage, and clicks a control for starting the small window in the dialog window, and the terminal generates the small window instruction.

Correspondingly, step S30 may include the following.

Step S33: Extracting a current dialog window of an instant messaging webpage as a to-be-converted window.

The terminal extracts the current dialog window of the instant messaging webpage according to the small window instruction. In this embodiment, a small window is displayed on the current page of the browser. Therefore, the terminal may directly convert the extracted dialog window of the instant messaging webpage into a floating small window, and display the floating small window obtained through conversion on the top of the current page of the browser.

In this embodiment, a terminal converts a dialog window of an instant messaging webpage into a floating small window, and displays the floating small window on the top of a current page of a browser. Therefore, when browsing another page, a user does not need to switch between the browsed page and the instant messaging webpage. This is convenient for the user to check an instant messaging conversation information at the same time of browsing a webpage.

Figure 5:
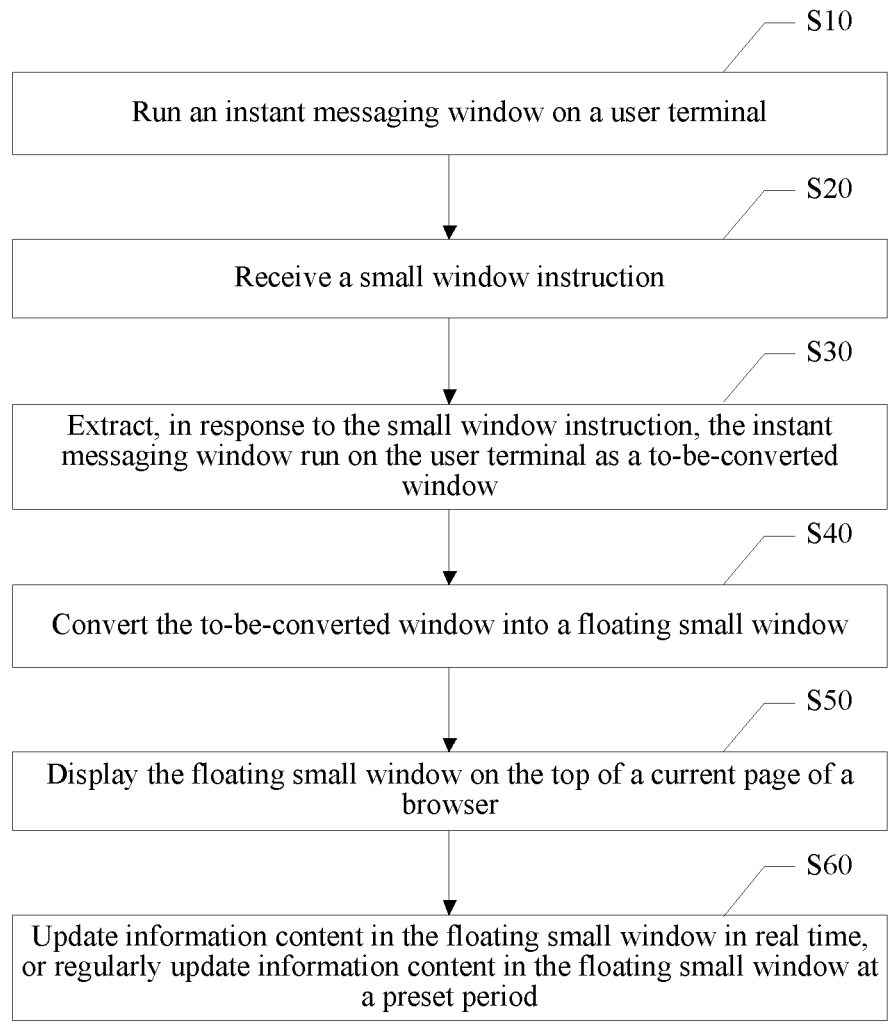
FIG. 5 is a flowchart of a fourth embodiment of an instant messaging window display method according to the present disclosure.

As shown in FIG. 5, FIG. 5 is a flowchart of a fourth embodiment of an instant messaging window display method according to the present disclosure. This embodiment includes all steps in the embodiment shown in FIG. 2, and after step S50, further includes the following.

Step S60: Updating information content in a floating small window in real time, or regularly updating information content in a floating small window at a preset period. In some embodiments, the terminal may provide options to identify certain information to be updated in real time and other information to be updated at a regular preset time interval. For example, information to be updated in real time may include, for example, video/audio call request, text messages, and emoticons, and information to be updated at a regular time interval may include, for example, file transmission requests, profile picture or mood message of the contact. Further, the preset period/interval may also be customized.

In this embodiment, to help a user check instant messaging conversation content in time, information related to a current account may be obtained from a network in a real-time update manner, and the obtained information is updated to a floating small window in time, for the user to check. In addition, considering that information update is affected by factors such as a network and a processing capability of a terminal, alternatively, an update period may be preset in a regular update manner. Each time the terminal reaches the preset period, the information related to the current account is obtained from the network, and the obtained information is updated to the floating small window, for the user to check. Correspondingly, a real-time update option or a regular update option may be provided in a function setting bar or a configuration menu of an instant messaging client or an instant messaging webpage, for the user to select from. In some embodiments, the two updating options may be provided in the floating small window or may be prompted to the user when the small window instruction is received. In addition, a new message sent by another user may also be obtained in the real-time update manner or the regular update manner. In some embodiments, the new message may not be displayed immediately when the terminal receives the new message, and instead, may be prompted beside the floating small window in a message prompt manner or as a push notification. In this embodiment, information content of the floating small window is updated in the real-time update manner or the regular update manner. This is convenient for the user to obtain an instant messaging conversation information in time when the user operates another page of a browser.

Figure 6:
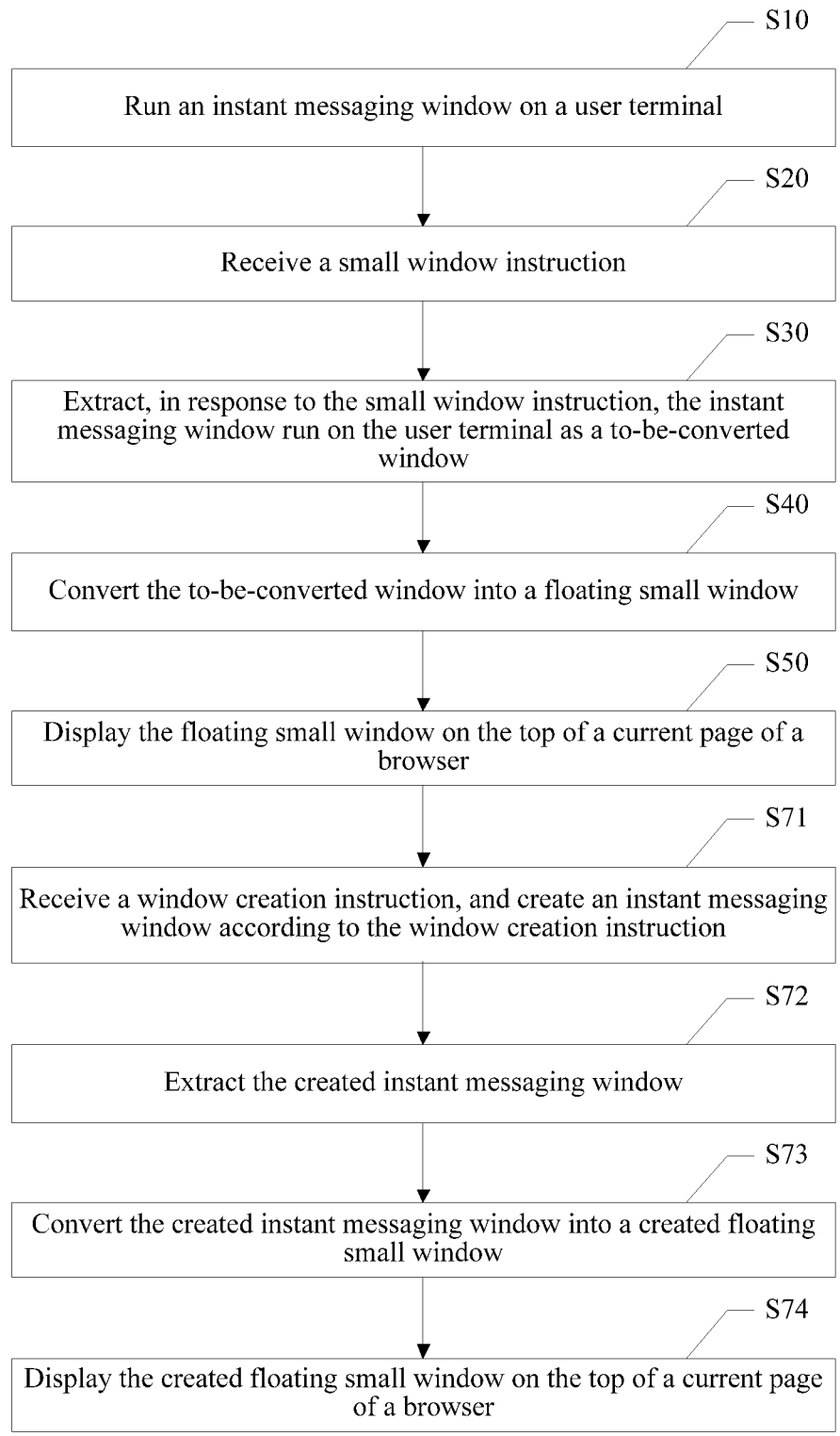
FIG. 6 is a flowchart of a fifth embodiment of an instant messaging window display method according to the present disclosure.

As shown in FIG. 6, FIG. 6 is a flowchart of a fifth embodiment of an instant messaging window display method according to the present disclosure. This embodiment includes all steps in the embodiment shown in FIG. 2, and after step S50, further includes the following.

Step S71: Receiving a window creation instruction, and creating an instant messaging window according to the window creation instruction.

Step S72: Extracting the created instant messaging window.

Step S73: Converting the created instant messaging window into a created floating small window.

Step S74: Displaying the created floating small window on the top of a current page of a browser.

In this embodiment, when a user needs to have a dialog with another friend on an instant messaging client or an instant messaging page, the user may re-open a contact interface of the instant messaging client or the instant messaging webpage on the browser, to select a user with whom the user needs to have a dialog, to create a dialog window. Alternatively, the user may receive a notification of an incoming message from another friend, and may select the notification to start the dialog window with this friend. In other words, the user terminal may create a new instant messaging window in both scenarios. If a terminal uses the first manner for starting a small window in the foregoing embodiment, and because the user already ticks, in advance, an option for starting the small window on a setting interface of the instant messaging client or the instant messaging webpage, when creating the dialog window, the terminal directly extracts the created instant messaging window, converts the created instant messaging window into a floating small window, and displays the floating small window on the top of a browsed page. If the second manner for starting the small window in the foregoing embodiment is used, after creating the dialog window, the terminal needs to display the created dialog window. The user clicks a control for starting the small window in the dialog window, and then the terminal converts the created instant messaging window into a floating small window, and displays the floating small window on the top of a browsed page.

In addition, the foregoing two manners for starting the small window may be combined. That is, after the user already clicks the control for starting the small window in the dialog window for the first time, it is considered by default that all subsequent created dialog windows are displayed as small windows. An original manner for displaying the instant messaging window is restored, until the user chooses to exit small window display. In addition, when a network obtains a new message of another user, prompt information may be displayed beside the floating small window. After the user clicks the prompt information, a corresponding message dialog window pops up. The message dialog window may be converted, in the foregoing manner for creating a window, into a created floating small window for display. The created floating small window and the original floating small window may be displayed in a parallel manner or a superimposed/layered manner, and a location of the floating small window (both newly-created and original) may be adjusted in a dragging manner. In this embodiment, the new dialog window is also converted into a floating small window in a manner of creating a floating small window, and the floating small window is displayed on the top of a current page of a browser. This is convenient for the user to check an instant messaging message when operating another page of the browser.

In some embodiments, when the user selects to close the floating small window, the regular dialog window may be restored. If the floating small window is created and converted from a dialog window in the instant messaging webpage, the dialog window may be restored in the instant messaging webpage. If the floating small window is created and converted from a dialog window of the instant messaging client, the dialog window of the instant messaging client may be restored. Further, when the user closes the browser, the dialog window of the instant messaging client may be automatically restored.

Figure 7:
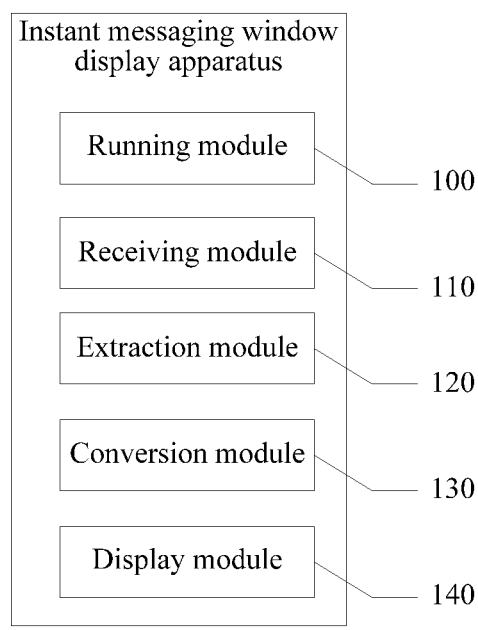
FIG. 7 is a schematic diagram of modules of a first embodiment of an instant messaging window display apparatus according to the present disclosure.

As shown in FIG. 7, FIG. 7 is a schematic diagram of modules of a first embodiment of an instant messaging window display apparatus according to the present disclosure. The instant messaging window display apparatus mentioned in this embodiment includes: a running module 100, configured to run an instant messaging window on a user terminal; a receiving module 110, configured to receive a small window instruction; an extraction module 120, configured to: extract, in response to the small window instruction, the instant messaging window run on the user terminal as a to-be-converted window; a conversion module 130, configured to convert the to-be-converted window into a floating small window; and a display module 140, configured to display the floating small window on the top of a current page of a browser.

A hardware implementation environment of this embodiment may be a terminal, which includes: a mobile phone, a desktop computer, a tablet computer, an all-in-one machine, and the like. A user opens an instant messaging webpage on the terminal by using an instant messaging client or a browser, to interact with another person in an instant messaging dialog window. When the user wants to browse another webpage, the user may select an option for starting a small window on the instant messaging client or the instant messaging webpage, to generate the small window instruction. There are two manners for entering the small window instruction. One manner is directly setting the option for starting the small window in a function setting bar of the instant messaging client or the instant messaging webpage. The user may tick, in advance, the option for starting the small window, so that when the user opens the dialog window, the terminal directly generates the small window instruction, and executes subsequent extraction, conversion, and display operations. The other manner is setting the option for starting the small window in the dialog window. After opening the dialog window, the user clicks a control for starting a small window in the dialog window, and the terminal generates the small window instruction.

The terminal extracts the currently opened dialog window according to the small window instruction, and coverts the currently opened dialog window into the floating small window in a form of a small-sized floating window. If the browser is not opened at present, the terminal first opens the browser. If the browser is already opened, the terminal displays, by default, the floating small window obtained through conversion on a specified area of the current page of the browser, and always keeps floatingly displaying the floating small window on the top. The specified area may be preset areas at four corners of the current page of the browser. The specified area is used only as an initial display location of the floating small window. If content of the page is covered on the area, the user may drag the floating small window to any location on the browser. When initially displayed, the floating small window may be displayed according to a preset default size. The user may drag a frame of the floating small window, to scale up or scale down the floating small window. The floating small window and an existing instant messaging window have a same function. The user may check conversation information between the user and a peer user in the floating small window, and may execute a corresponding operation in the floating small window, for example, entering and sending information or a file. When the user browses a page or executes a page operation on the browser, for example, clicks an operating control on a page, creates a page, closes a page, and switches a page, display of the floating small window is not affected, and the floating small window is always kept being displayed on the top of the browser.

In this embodiment, the terminal converts the instant messaging window into the floating small window, and always keeps displaying the floating small window on the top of the current page of the browser. When the user browses and operates another webpage on the browser, the display of the floating small window is not affected. This is convenient for the user to check an instant messaging interaction message in time, thereby improving convenience of instant messaging interaction.

Further, if the instant messaging window is the dialog window of the instant messaging client and the small window instruction is entered in the instant messaging client, the extraction module 120 is further configured to: extract the dialog window of the instant messaging client; and convert the dialog window into a dialog window of the instant messaging webpage, and use the dialog window of the instant messaging webpage as a to-be-converted window.

In this embodiment, for a case in which a user uses the instant messaging client on a terminal, the user selects, in the instant messaging client, an option for starting a small window, to generate the small window instruction. If the first manner for starting the small window in the foregoing embodiment is used, the user ticks, in advance, the option for starting the small window on a setting interface of the instant messaging client. When the user opens the dialog window, the terminal directly generates the small window instruction. If the second manner for starting the small window in the foregoing embodiment is used, the user first opens the dialog window of the instant messaging client, and clicks a control for starting the small window in the dialog window, and the terminal generates the small window instruction.

The terminal extracts the current dialog window of the instant messaging client according to the small window instruction. In this embodiment, the small window needs to be displayed on a current page of a browser. Therefore, before converting the dialog window into a floating small window, the terminal further needs to convert the dialog window of the client into a webpage-version dialog window, and then converts the webpage-version dialog window into the floating small window. In addition, the terminal may further trigger, according to the small window instruction, the browser to run, and displays the floating small window obtained through conversion on the top of the current page of the browser.

In this embodiment, the dialog window of the instant messaging client is converted, so that the dialog window of the instant messaging client can also be converted into the floating small window, and the floating small window is displayed on the top of the current page of the browser. In this way, when browsing another page, the user does not need to switch between the browser and the instant messaging client. This is convenient for the user to check an instant messaging conversation information at the same time of browsing a webpage.

Further, if the instant messaging window is the dialog window of the instant messaging webpage and the small window instruction is entered in the instant messaging webpage, the extraction module 120 is further configured to extract the dialog window of the instant messaging webpage as a to-be-converted window.

In this embodiment, for a case in which a user uses the instant messaging webpage on the terminal, the user selects, in the instant messaging webpage, an option for starting a small window, to generate the small window instruction. If the first manner for starting the small window in the foregoing embodiment is used, the user ticks, in advance, the option for starting the small window on a setting interface of the instant messaging webpage. When the user opens the dialog window, the terminal directly generates the small window instruction. If the second manner for starting the small window in the foregoing embodiment is used, the user first opens the dialog window of the instant messaging webpage, and clicks a control for starting the small window in the dialog window, and the terminal generates the small window instruction.

The terminal extracts the current dialog window of the instant messaging webpage according to the small window instruction. In this embodiment, a small window is displayed on the current page of the browser. Therefore, the terminal may directly convert the extracted dialog window of the instant messaging webpage into a floating small window, and display the floating small window obtained through conversion on the top of the current page of the browser.

In this embodiment, a terminal converts a dialog window of an instant messaging webpage into a floating small window, and displays the floating small window on the top of a current page of a browser. In this way, when browsing another page, a user does not need to switch between the browsed page and the instant messaging webpage. This is convenient for the user to check an instant messaging conversation information at the same time of browsing a webpage.

Figure 8:
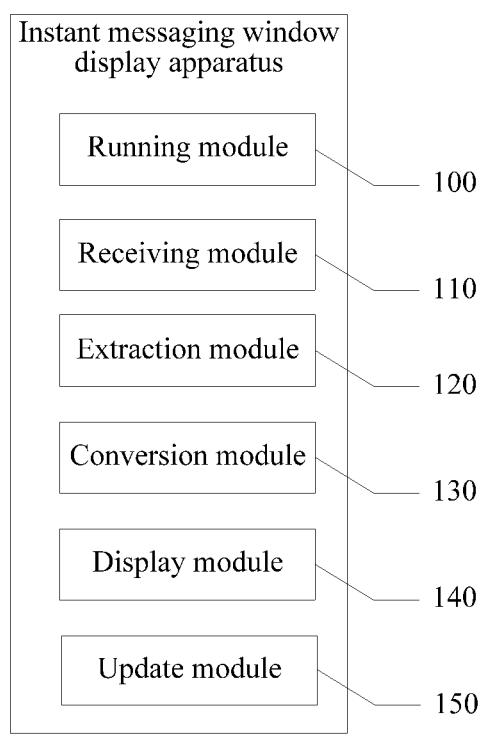
FIG. 8 is a schematic diagram of modules of a second embodiment of an instant messaging window display apparatus according to the present disclosure.

As shown in FIG. 8, FIG. 8 is a schematic diagram of modules of a second embodiment of an instant messaging window display apparatus according to the present disclosure. This embodiment includes all modules in the embodiment shown in FIG. 7, and an update module 150 is added, which is configured to: update information content in a floating small window in real time, or regularly update information content in a floating small window at a preset period.

In this embodiment, to help a user check instant messaging conversation content in time, information related to a current account may be obtained from a network in a real-time update manner, and the obtained information is updated to the floating small window in time, for the user to check. In addition, considering that information update is affected by factors such as a network and a processing capability of a terminal, alternatively, an update time may be preset in a regular update manner. Each time the terminal reaches the preset time interval, the information related to the current account is obtained from the network, and the obtained information is updated to the floating small window, for the user to check. Correspondingly, a real-time update option or a regular update option may be provided in a function setting bar of an instant messaging client or an instant messaging webpage, for the user to select from. In addition, a new message sent by another user may also be obtained in the real-time update manner or the regular update manner. However, the new message is not currently displayed, and instead, is prompted beside the floating small window in a message prompt manner. In this embodiment, information content of the floating small window is updated in the real-time update manner or the regular update manner. This is convenient for the user to obtain an instant messaging conversation information in time when the user operates another page of a browser.

Further, the following modules are further configured to create a window:

The receiving module 110 is further configured to: receive a window creation instruction, and create an instant messaging window according to the window creation instruction.

The extraction module 120 is further configured to extract the created instant messaging window.

The conversion module 130 is further configured to convert the created instant messaging window into a created floating small window.

The display module 140 is further configured to display the created floating small window on the top of a current page of a browser.

In this embodiment, when a user needs to have a dialog with another friend on an instant messaging client or an instant messaging page, the user may re-open a contact interface of the instant messaging client or the instant messaging page, to select a user with whom the user needs to have a dialog, to create a dialog window. If a terminal uses the first manner for starting a small window in the foregoing embodiment, and because the user already ticks, in advance, an option for starting the small window on a setting interface of the instant messaging client or the instant messaging webpage, when creating the dialog window, the terminal directly extracts the created instant messaging window, converts the created instant messaging window into a floating small window, and displays the floating small window on the top of a browsed page. If the second manner for starting the small window in the foregoing embodiment is used, after creating the dialog window, the terminal needs to display the created dialog window. The user clicks a control for starting the small window in the dialog window, and then the terminal converts the created instant messaging window into a floating small window, and displays the floating small window on the top of a browsed page. In addition, the foregoing two manners for starting the small window may be combined. That is, after the user already clicks the control for starting the small window in the dialog window for the first time, it is considered by default that all subsequent created dialog windows are displayed as small windows. An original manner for displaying the instant messaging window is restored, until the user chooses to exit small window display. In addition, when a network obtains a new message of another user, prompt information may be displayed beside the floating small window. After the user clicks the prompt information, a corresponding message dialog window pops up. The message dialog window may be converted, in the foregoing manner for creating a window, into a created floating small window for display. The created floating small window and the original floating small window may be displayed in a parallel manner or a superimposed manner, and a location of the floating small window is moved in a dragging manner. In this embodiment, the new dialog window is also converted into a floating small window in a manner of creating a floating small window, and the floating small window is displayed on the top of a current page of a browser. This is convenient for the user to check an instant messaging message when operating another page of the browser.

According to an embodiment of the present invention, a computer readable medium is provided, and configured to store one or more computer programs, where the one or more computer programs include instructions that can be executed by a computer system having one or more memories; and the instructions enable the computer system to execute the following operations: running an instant messaging window on a user terminal; receiving a small window instruction; extracting, in response to the small window instruction, the instant messaging window run on the user terminal as a to-be-converted window; converting the to-be-converted window into a floating small window; and displaying the floating small window on the top of a current page of a browser.

In an embodiment, an instant messaging window is a dialog window of an instant messaging client, and the small window instruction is entered in the instant messaging client; and the extracting the instant messaging window run on the user terminal as a to-be-converted window includes: extracting the dialog window of the instant messaging client; and converting the dialog window into a dialog window of an instant messaging webpage, and using the dialog window of the instant messaging webpage as the to-be-converted window.

In an embodiment, an instant messaging window is a dialog window of an instant messaging webpage, and a small window instruction is entered in the instant messaging webpage; and the extracting the instant messaging window run on the user terminal as a to-be-converted window includes: extracting the dialog window of the instant messaging webpage as the to-be-converted window.

In an embodiment, after the displaying the floating small window on the top of a current page of a browser, the instructions further enable the computer system to execute the following operation: updating information content in the floating small window in real time; or updating information content in the floating small window at a preset period.

Optionally, after the displaying the floating small window on the top of a current page of a browser, the instructions further enable the computer system to execute the following operations: receiving a window creation instruction, and creating an instant messaging window according to the window creation instruction; extracting the created instant messaging window; converting the created instant messaging window into a created floating small window; and displaying the created floating small window on the top of the current page of the browser.

It should be noted that the terms "include", "include", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Unless otherwise specified, an element limited by "include a/an . . . " does not exclude other same elements existing in the process, the method, the object, or the apparatus that includes the element.

The sequence numbers of the foregoing embodiments of the present invention are merely for the convenience of description, and do not imply the preference among the embodiments.

Through the foregoing descriptions of the implementation manners, it is clear to a person skilled in the art that the present disclosure may be implemented by software plus a necessary universal hardware platform, and certainly may be implemented by hardware, but in many cases, the software implementation is preferred. Based on such an understanding, the technical solutions of the present disclosure or the part that makes contributions to the existing technology may be substantially embodied in the form of a software product. The computer software product is stored in a storage medium (for example, a ROM/RAM, a magnetic disk, or an optical disc), and includes several instructions for instructing a terminal device (which may be a mobile phone, a computer, a server, or a network device) to perform the method described in the embodiments of the present invention.

The foregoing descriptions are merely examples of the embodiments of the present invention but are not intended to limit the patent scope of the present disclosure. Any equivalent modifications made to the structures or procedures based on the content of the specification and the accompanying drawings of the present disclosure for direct or indirect use in other relevant technical fields shall fall in the patent protection scope of the present disclosure.

What is claimed is:

1. An instant messaging window display method performed at a user terminal having a memory and a processor coupled to the memory, the method comprising:
running a first instant messaging window on the user terminal, the first instant messaging window being in communication with and run by an instant messaging server;
receiving a floating chat window instruction;
converting the first instant messaging window into a first floating chat window according to the floating chat window instruction to facilitate web-browsing, wherein the first instant messaging window is a dialog window of an instant messaging client, and the floating chat window instruction is entered in the instant messaging client, or wherein the first instant messaging window is a dialog window of an instant messaging webpage, and the floating chat window instruction is entered in the instant messaging webpage;
displaying the first floating chat window on top of a first webpage of a browser, the first webpage being in communication and run by a web server different than the instant messaging server; and
converting the first floating chat window back to the first instant messaging window after receiving an instruction to exit web-browsing.

2. The instant messaging window display method according to claim 1, wherein the first instant messaging window is the dialog window of the instant messaging client, and the floating chat window instruction is entered in the instant messaging client; and converting the first instant messaging window into the first floating chat window comprises:
extracting the dialog window of the instant messaging client;
converting the dialog window of the instant messaging client into a dialog window of an instant messaging webpage; and
converting the dialog window of the instant messaging webpage into the first floating chat window.

3. The instant messaging window display method according to claim 1, wherein the first instant messaging window is the dialog window of the instant messaging webpage, and the floating chat window instruction is entered in the instant messaging webpage; and converting the first instant messaging window into the first floating chat window comprises:
converting the dialog window of the instant messaging webpage into the first floating chat window.

4. The instant messaging window display method according to claim 1, further comprising:
presenting a second webpage on the browser; and
displaying the first floating chat window on top of the second webpage.

5. The instant messaging window display method according to claim 1, further comprising:
displaying a second floating chat window on top of the first webpage of the browser, the second floating chat window being positioned on the first webpage of the browser at a location different from a location of the first floating chat window.

6. The instant messaging window display method according to claim 1, further comprising:
displaying the first instant messaging window on a screen of the user terminal at a first timepoint; and
displaying the first webpage on the screen of the user terminal at a second timepoint later in time than the first timepoint.

7. An instant messaging window display apparatus, comprising: a memory and a processor coupled to the memory, the processor being configured to:
run a first instant messaging window on a user terminal, the first instant messaging window being in communication with and run by an instant messaging server;
receive a floating chat window instruction;
convert the first instant messaging window into a first floating chat window according to the floating chat window instruction to facilitate web-browsing, wherein the first instant messaging window is a dialog window of an instant messaging client, and the floating chat window instruction is entered in the instant messaging client, or wherein the first instant messaging window is a dialog window of an instant messaging webpage, and the floating chat window instruction is entered in the instant messaging webpage;
display the first floating chat window on top of a first webpage of a browser, the first webpage being in communication and run by a web server different than the instant messaging server; and
convert the first floating chat window back to the first instant messaging window after receiving an instruction to exit web-browsing.

8. The instant messaging window display apparatus according to claim 7, wherein the first instant messaging window is the dialog window of the instant messaging client, and the floating chat window instruction is entered in the instant messaging client; and the processor is further configured to:
extract the dialog window of the instant messaging client; and
convert the dialog window of the instant messaging client into a dialog window of an instant messaging webpage; and
convert the dialog window of the instant messaging webpage into the first floating chat window.

9. The instant messaging window display apparatus according to claim 7, wherein the first instant messaging window is the dialog window of the instant messaging webpage, and the floating chat window instruction is entered in the instant messaging webpage; and the processor is further configured to:
convert the dialog window of the instant messaging webpage into the first floating chat window.

10. The instant messaging window display apparatus according to claim 7, wherein the processor is further configured to:
present a second webpage on the browser; and
display the first floating chat window on top of the second webpage.

11. The instant messaging window display apparatus according to claim 7, wherein the processor is further configured to:
display a second floating chat window on top of the first webpage of the browser, the second floating chat window being positioned on the first webpage of the browser at a location different from a location of the first floating chat window.

12. The instant messaging window display apparatus according to claim 7, wherein the processor is further configured to:
display the first instant messaging window on a screen of the user terminal at a first timepoint; and
display the first webpage on the screen of the user terminal at a second timepoint later in time than the first timepoint.

13. A non-transitory computer readable storage medium containing one or more computer-executable programs for, when being executed by a processor, implementing an instant messaging window display method, the method comprising:
running a first instant messaging window on a user terminal, the first instant messaging window being in communication with and run by an instant messaging server;
receiving a floating chat window instruction;
converting the first instant messaging window into a first floating chat window according to the floating chat window instruction to facilitate web-browsing, wherein the first instant messaging window is a dialog window of an instant messaging client, and the floating chat window instruction is entered in the instant messaging client, or wherein the first instant messaging window is a dialog window of an instant messaging webpage, and the floating chat window instruction is entered in the instant messaging webpage;
displaying the first floating chat window on top of a first webpage of a browser, the first webpage being in communication and run by a web server different than the instant messaging server; and
converting the first floating chat window back to the first instant messaging window after receiving an instruction to exit web-browsing.

14. The computer readable medium according to claim 13, wherein the first instant messaging window is the dialog window of the instant messaging client, and the floating chat window instruction is entered in the instant messaging client; and converting the first instant messaging window into the first floating chat window comprises:
extracting the dialog window of the instant messaging client;
converting the dialog window of the instant messaging client into a dialog window of an instant messaging webpage; and
converting the dialog window of the instant messaging webpage into the first floating chat window.

15. The computer readable medium according to claim 13, wherein the first instant messaging window is the dialog window of the instant messaging webpage, and the floating chat window instruction is entered in the instant messaging webpage; and the converting the first instant messaging window into the first floating chat window comprises:

converting the dialog window of the instant messaging webpage into the first floating chat window.

16. The non-transitory computer readable storage medium according to claim 13, wherein the method further comprises:

presenting a second webpage on the browser; and displaying the first floating chat window on top of the second webpage.

17. The non-transitory computer readable storage medium according to claim 13, wherein the method further comprises:

displaying a second floating chat window on top of the first webpage of the browser, the second floating chat window being positioned on the first webpage of the browser at a location different from a location of the first floating chat window.

18. The non-transitory computer readable storage medium according to claim 13, wherein the method further comprises:

displaying the first instant messaging window on a screen of the user terminal at a first timepoint; and displaying the first webpage on the screen of the user terminal at a second timepoint later in time than the first timepoint.

* * * * *